Figure 1:
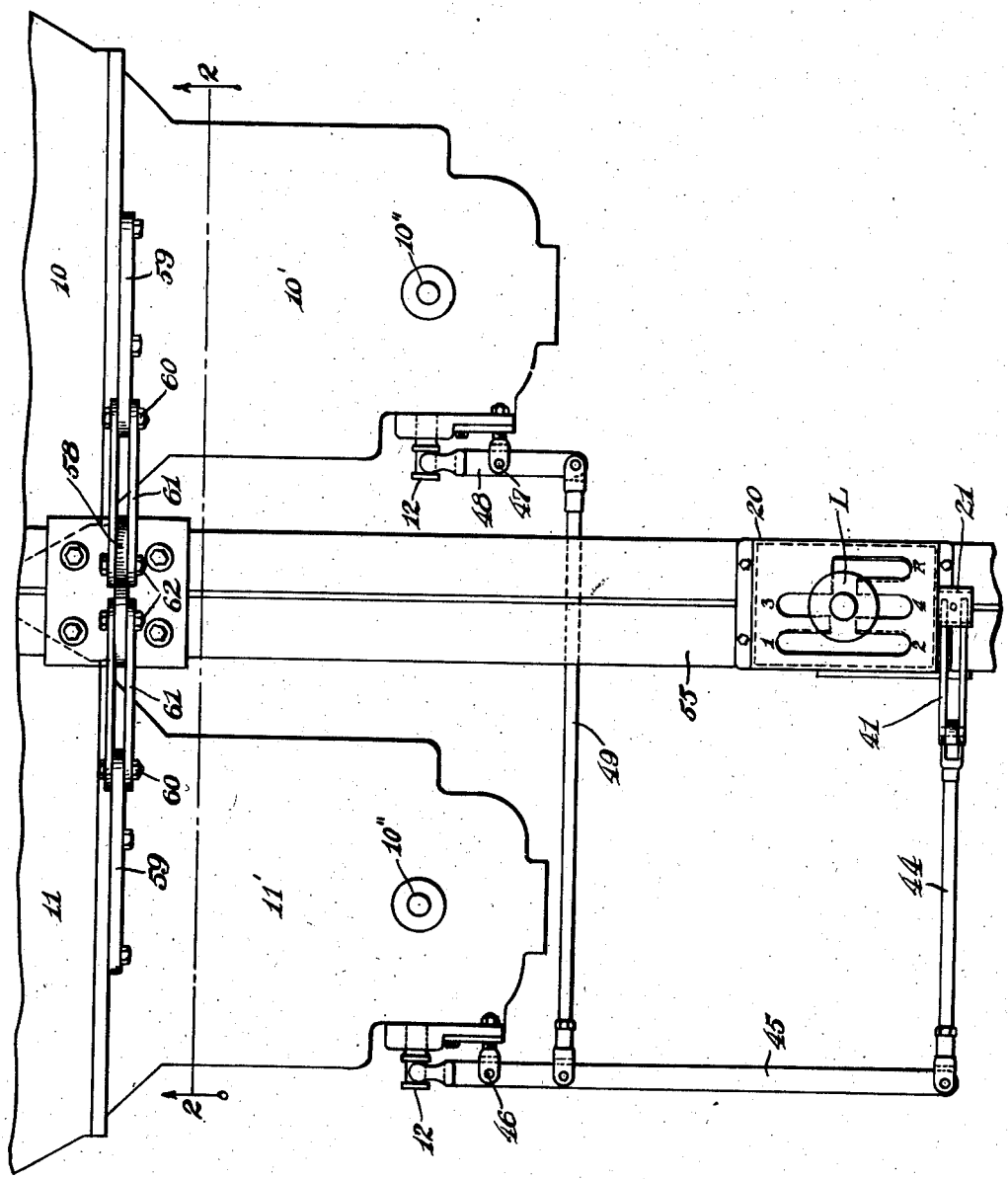

July 20, 1943.　　　P. SCHON　　　2,324,542
DUAL TRANSMISSION CONTROL
Filed Sept. 14, 1942　　　3 Sheets-Sheet 1

INVENTOR.
Pierre Schon,
BY:
Hood & Hahn
ATTORNEYS

July 20, 1943.   P. SCHON   2,324,542
DUAL TRANSMISSION CONTROL
Filed Sept. 14, 1942   3 Sheets-Sheet 2
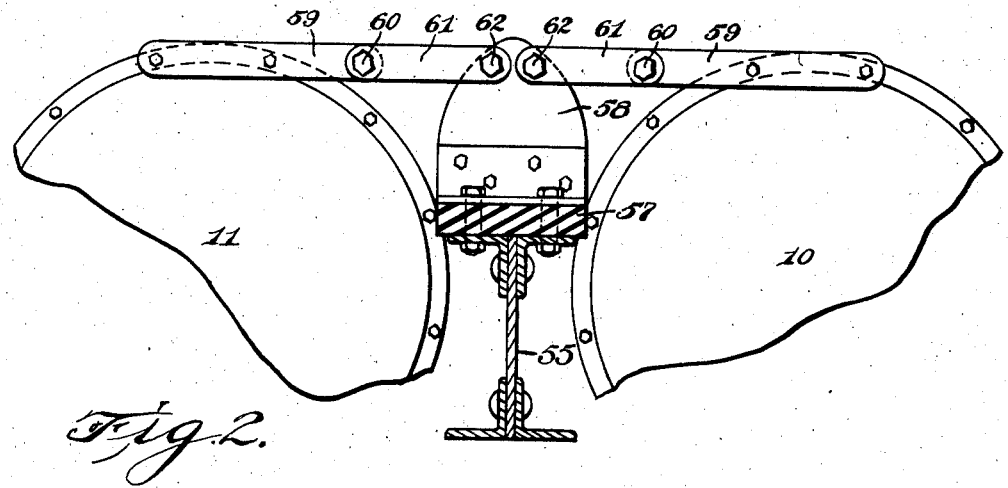
Fig. 2.
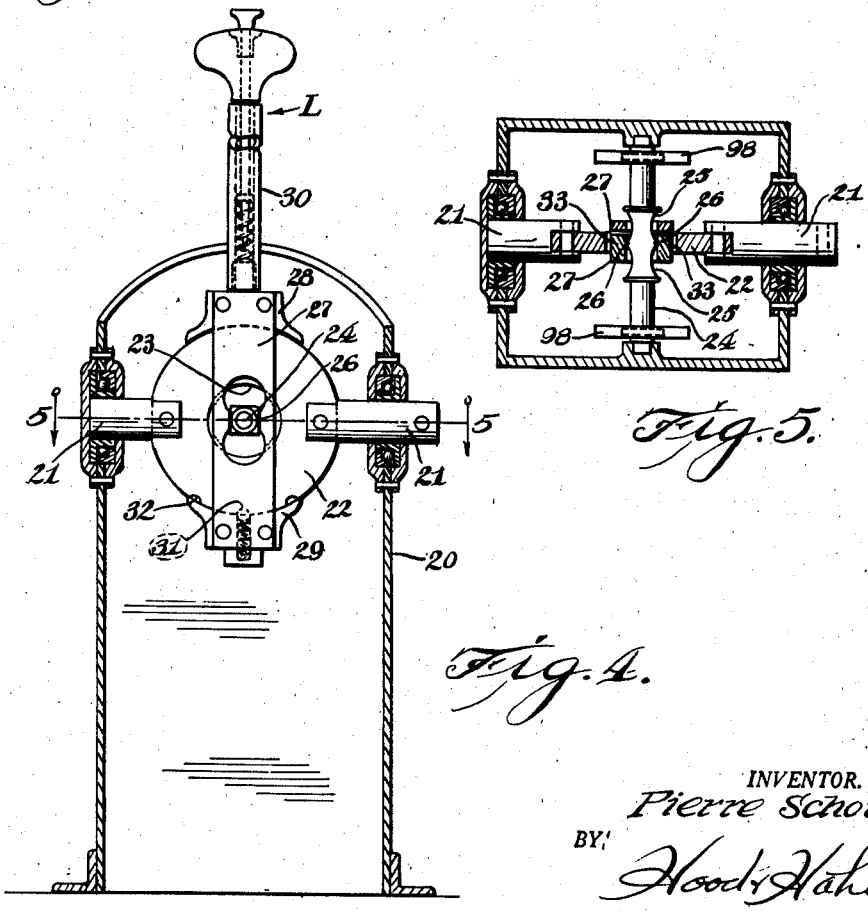
Fig. 4.
Fig. 5.
INVENTOR.
Pierre Schon,
BY
Hood & Hahn
ATTORNEYS.

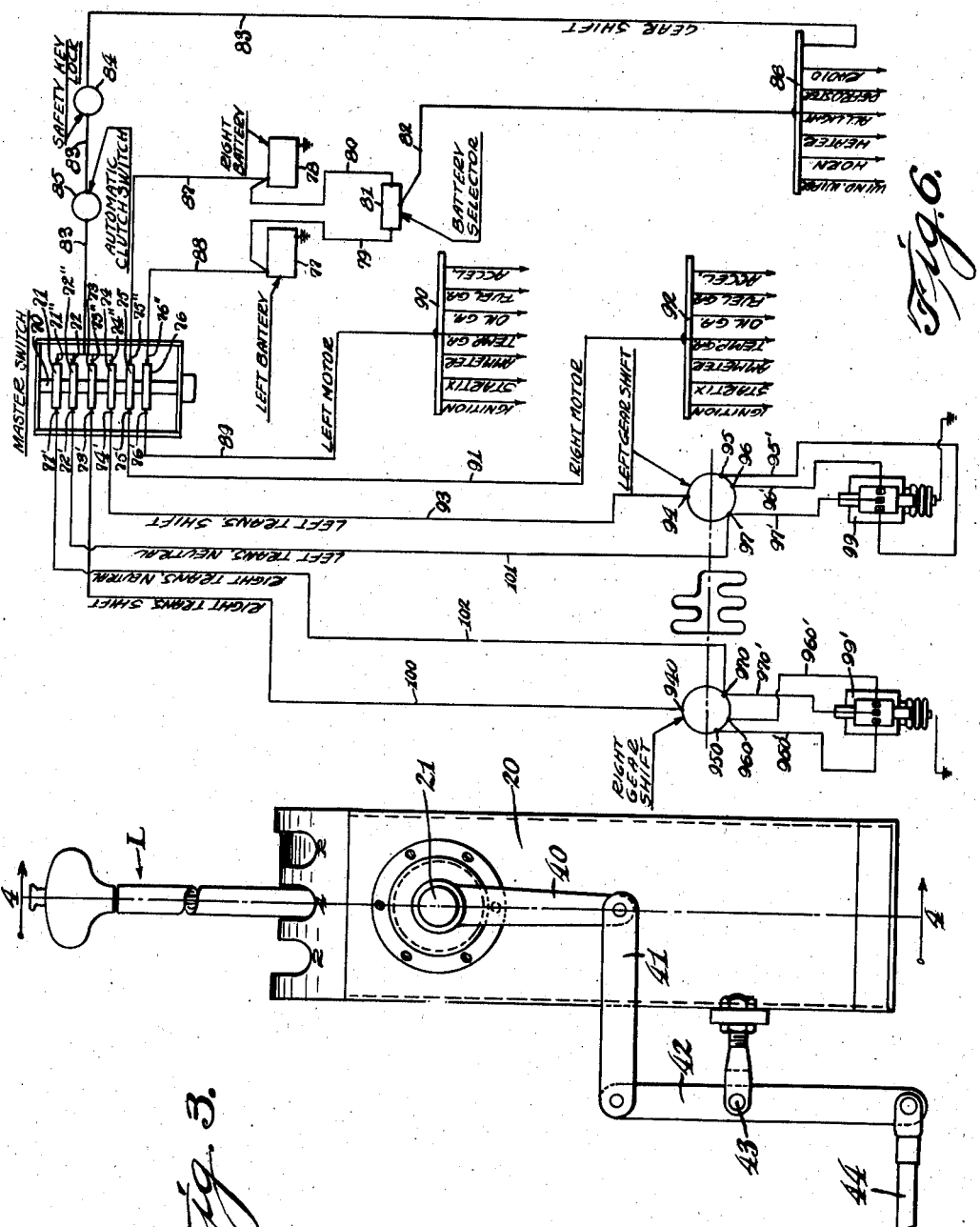

Patented July 20, 1943

2,324,542

UNITED STATES PATENT OFFICE 2,324,542

DUAL TRANSMISSION CONTROL

Pierre Schon, Indianapolis, Ind., assignor to Marmon-Herrington Company, Inc., Indianapolis, Ind., a corporation of Indiana Application September 14, 1942, Serial No. 458,289

3 Claims. (Cl. 74—473)

My invention relates to that type of motor vehicles provided with two internal combustion engines connected each through its own transmission gearing to its own set of ground wheels.

In such an apparatus, the operator should be able to selectively energize either of said engines together with selective positioning of the appropriate transmission gearing, or to simultaneously energize both of said engines and concurrently selectively position the two transmission gearings.

The object of my present invention is to provide simplified means by which the operator may manually determine the selective energization of the engines and appropriate positioning of the transmission gearings.

The accompanying drawings illustrate my invention.

Fig. 1 is a plan of an embodiment of my invention;

Fig. 2 a vertical section on line 2—2 of Fig. 1;

Fig. 3 a side elevation of the master hand-controlled lever and associate parts;

Fig. 4 a vertical section on line 4—4 of Fig. 3;

Fig. 5 a section on line 5—5 of Fig. 4; and

Fig. 6 a wiring diagram.

In the well-known "Bendix" control apparatus for single engines, a manually operable lever, shiftable laterally and also oscillable fore-and-aft, controls various electrical circuits which, in turn, control the operation of power means both for selecting portions of transmission gearing to be later actuated and for actually shifting the gears after the selective movements have been accomplished. When two independent engines are installed in a chassis frame the multiplicity of essential electrical circuits and controls results in installation and maintenance difficulties and therefore, in my present apparatus, I provide mechanical connections between my manually-operable control lever and the "selective" mechanisms of the transmission gears but retain the electrically-controlled power-actuated means for actually shifting the gears of the transmissions. The resulting simplification of installation and maintenance has been found to be desirable.

Each engine 10 and 11, and its attached transmission gearing 10' or 11', is mounted in the chassis frame on the usual yieldable footings (not shown), as has long been customary in mounting single engines. Such mountings permit slight movements of the engine body relative to the chassis, both vertically and rotatively, substantially about the fore-and-aft axes of the engines.

In my present apparatus the actual gear shifting, after preliminary setting of the selector rods 12, 12, is accomplished by electrically controlled power means, of well known construction, wherein essential electrical circuits are controlled by the fore-and-aft movements of a primary control lever, but, for simplification, I prefer to manually shift rods 12 by means of a master control lever L, which also controls electrical circuits, by its fore-and-aft movements which, in turn, cause corresponding power-actuated fore-and-aft movements of the gear-shifting means. Such electrically controlled power means for shifting the gears of the transmissions are well known and form no part of my present invention. In the master control pedestal 20 are journalled the fore-and-aft trunnions 21, 21 of a disk 22 centrally perforated at 23, and extending through this perforation is the transverse shaft 24 journalled at its ends in pedestal 20 on a horizontal axis at right angles to the axis of trunnions 21. Shaft 24, at its middle, is flattened transversely at diametrically opposite sides into surfaces 25, 25 extending axially from the middle of the shaft and forming, at the middle of the shaft, transverse ridges 26, 26. Lever L comprises two parallel bars 27, 27, one against each face of disk 22 and connected at their ends by segmental spacers 28 and 29, spacer 28 being provided with a hand-engageable extension 30.

Spacers 28 and 29 have sufficient arcuate contact with the periphery of disk 22 to rotatively support lever L on disk 22 without binding, and indexing means, of common form, comprising the spring pressed ball 31 and notches 32 in the periphery of the disk 22 serves to position lever L rotatively on disk 22.

Bars 27 are medially slotted to receive shaft 24, and the inner face of one of these bars, at its middle, carries lugs 33, 33 which enter perforation 23 and engage the opposite ridges 26, 26 of the surfaces 25, 25 of the shaft 24 so that swinging of the structure 22, 27, 28, 29, 27 around disk 22 will oscillate shaft 24 irrespective of the displacement of disk 22 about the axis of trunnions 21. Shaft 24 carries contact elements which control the power shift of the transmission gearing and form no part of my present invention.

Secured to one of trunnions 21 is an arm 40 connected by link 41 with a lever 42 pivoted at 43 on pedestal 20 and connected by link 44 with a lever 45, pivoted, at 46, on the housing of the transmission 11' and engaging the adjacent selector rod 12.

Pivoted at 47 on the other transmission casing 10' is a lever 48 which engages the adjacent selective rod 12, and connecting the two levers 45 and 48 is the link 49.

In view of the fact that it is intended that at times one or the other of the engines may be idle, while at other times both may be subject to load, it is apparent that slight rotative movement of one transmission casing (due to the usual cushion mounting of the engine body on the chassis), independent of the other, might, because of the linkage 45—49—48, result in inequality of movements of the two selector rods 12, 12 in response to movements of lever L. Such inequality is prevented, or reduced to negligible quantities by the following means:

The two engines 10 and 11 are arranged on opposite sides of the central longitudinal beam 55 of the chassis frame with their main shafts arranged fore-and-aft and are supported, as usual, on resilient footings on the chassis frame so that, if otherwise uncontrolled as to limited oscillation about longitudinal axes parallel with beam 55, independent oscillations of the two engines might occur. Therefore, in order to snub one engine against the other, I provide the mechanism now to be described.

Between the bodies of engines 10 and 11 (or the transmission housings 10' and 11') on beam 55, I provide a vertically resilient footing, such as a rubber pad 57, upon which is mounted an upwardly extending bracket or snubbing post 58. Secured to each engine body (or transmission housing) is a rigid finger 59 projecting toward post 58. Pivoted to the free end of each finger 59 at 60 is a link 61 which, in turn, is pivoted at 62 to post 58. Preferably the four pivot points 60, 62, 62, 60 are in alignment when the engines are at rest. By this arrangement, rotative yield of either engine body is transmitted to the other engine body through the snubber bracket 58 and thereby the proper relation of the linkage is maintained so that oscillation of lever L about the axis of trunnions 21, 21 equally affects the selector rods 12 under all conditions. Because of the snubber linkage described, vertical oscillations of one engine body are not transmitted by the other engine body.

It is desirable, when one or the other of the engines is not to be operated, that the electric circuits controlling the gear-shifting mechanism of its transmission gearing, as well as the ignition circuit of the non-operating engine, be rendered inoperative, preferably by a single manual operation of the operator. It is desirable, also, that each engine be provided with a storage battery and that, in case of failure of either battery, the other be available as a substitute. To those ends, I provide the switches and circuits now to be described.

The master switch M comprises a shaft 70 carrying disks 71, 72, 73, 74, 75 and 76 which carry contact points appropriately spaced circumferentially, as will appear from the further description, and arranged to be contacted by these contact points are terminals 71', 71", 72', 72", 73', 73", 74', 74", 75', 75", and 76', 76". Batteries 77 and 78 are provided, respectively, for the left and right engines, with one terminal of each appropriately grounded and the opposite terminals connected by wires 79 and 80 with a battery selector 81 by means of which either battery may be utilized to supply current to bus bar 86 or the circuits controlled by parts 71, 72, 73 and 74. Leading from battery selector 81 is a wire 82 which leads to bus bar 86, from which leads are carried by various instrumentalities which are to be available, such, for instance, as windshield wiper, horn, heater, lights, defroster, radio, etc. Also leading from bus bar 86, is a wire 83 which leads through safety key lock 84 and automatic clutch switch 85 to terminals 71", 72", 73", 74". A wire 87 leads from battery 78 to terminal 75", and a wire 88 leads from the battery 77 to terminal 76". Wire 89 leads from terminal 76' to a bus bar 90 from which various leads lead to the ignition, starter, ammeter, temperature gauge, oil gauge, fuel gauge, accelerator, etc. of the left engine. Similarly, a wire 91 leads from terminal 75' to a bus bar 92 for the right engine and corresponding to bus bar 90. Wire 93 leads to a terminal 94 which is coordinated with terminals 95, 96 and 97 to coact with a switch element 98 (Fig. 5) carried by shaft 24 by means of which terminal 94 may be connected, respectively, with the terminals 95, 96 and 97, which terminals are, respectively, connected by wires 95', 96' and 97' which lead to appropriate terminals of the electrical gear shift control means 99 in a well known manner, said means being grounded as indicated.

Similarly, the wire 100 leads from terminal 73' to terminal 940 which is coordinated with terminals 950, 960 and 970, the latter terminals, 950, 960 and 970, being connected by wires 950', 960' and 970' with appropriate portions of the gear shift mechanism 99' for the right hand engine. Terminal 97 is connected by wire 101 with terminal 73' and terminal 970 is connected by wire 102 with terminal 71'. As previously stated, the disks 71 to 72, inclusive, are provided with circumferentially spaced contact points by which rotation of shaft 70 may be arranged, in or out of position to connect the opposed stationary terminals, so that in the zero position of the switch the neutral control for the right and left transmissions respectively, through the medium of discs 71 and 72, will be in circuit while the other disks will be out of circuit. Successive forward positions of shaft 70 will establish circuits for the left hand engine only, for the right hand engine only, and for both engines, so that the operator by manipulating this single switch may readily utilize either or both engines for propelling the vehicle.

I claim as my invention:

1. In a motor vehicle comprising, a chassis frame, two engines supported thereon and oscillable about parallel axes, and two speed-varying transmissions, one associated with each engine to partake of its said oscillations and each including a reciprocatory selector rod, two levers, one pivoted on each transmission and engaging the adjacent selector rod, a connection between said levers, a manually-operated master control lever, a connection between said control lever and one of said first-mentioned levers, and snubbing means connecting the two transmissions whereby lateral oscillations of one will be transmitted to the other.

2. In a motor vehicle comprising, a chassis frame, two engines supported thereon and oscillable about parallel axes, and two speed-varying transmissions, one associated with each engine to partake of its said oscillations and each including a reciprocatory selector rod, two levers, one pivoted on each transmission and engaging the adjacent selector rod, a connection between said levers, a manually-operated master control lever, a connection between said control lever and one of said first-mentioned levers, a snubbing post yieldably mounted on the chassis frame, and two oppositely extending links each pivoted to said post and to one of said engines, the axes of the pivotal connections being parallel with the engine axes.

3. A control element for motor vehicles comprising, a main support, an axially perforated disk provided with diametrically opposed trunnions journalled in said support, diametrically opposed arcuate shoes slidably mounted upon the periphery of said disk and connected by a bar extending across the face of said disk and provided with a perforation having two spaced and facing contact faces, a shaft projected through the disk and said bar between said contact faces and provided with a pair of diametrically opposed parallel ridges contacting said contact faces whereby shifting of the disk about the axis of its trunnions will, nevertheless, permit shifting of the shoes circumferentially upon the disk and corresponding rotation of the ridge-carrying shaft.

PIERRE SCHON.